(12) United States Patent
Mitsutani et al.

(10) Patent No.: US 6,496,269 B2
(45) Date of Patent: Dec. 17, 2002

(54) SHAPE MEASURING APPARATUS

(75) Inventors: Naoki Mitsutani, Davis, CA (US);
Hirohisa Handa, Kawasaki (JP);
Kazuhiko Kawasaki, Ushiku (JP);
Hiroshi Haino, Tsukuba (JP)

(73) Assignee: Mitutoyo Corporation, Kawasaki (JP)

( * ) Notice: Subject to any disclaimer, the term of this patent is extended or adjusted under 35 U.S.C. 154(b) by 106 days.

(21) Appl. No.: 09/783,207

(22) Filed: Feb. 15, 2001

(65) Prior Publication Data

US 2001/0035961 A1 Nov. 1, 2001

(30) Foreign Application Priority Data

Feb. 18, 2000 (JP) ........................................ 2000-041620

(51) Int. Cl.[7] .............................................. G01B 11/02
(52) U.S. Cl. ..................... 356/512; 356/495; 356/489
(58) Field of Search ................................ 356/495, 489, 356/512, 514, 491, 449

(56) References Cited

U.S. PATENT DOCUMENTS 5,218,423 A * 6/1993 Kishner ...................... 356/513
5,369,489 A * 11/1994 Somekh ...................... 356/489
6,020,963 A * 2/2000 DiMarzio .................... 356/491

FOREIGN PATENT DOCUMENTS

| JP | A 10-281738 | 10/1998 |
| JP | A 11-304417 | 11/1999 |
| JP | A 11-337321 | 12/1999 |

* cited by examiner

Primary Examiner—Robert H. Kim
Assistant Examiner—Elizabeth Gemmell
(74) Attorney, Agent, or Firm—Oliff & Berridge, PLC

(57) ABSTRACT

A shape measuring apparatus is provided, which is capable of accurately measuring the shape of an observed surface of an object to be measured and which can be designed to be compact in size and light in weight. An optical reflected image from an observed surface of an object to be measured and an optical reflected image from a reference surface are interfered with each other to generate interference light. The interference light is dispersed into at least three beams, which are shifted in phase by respective predetermined phase shifting amounts. At least three interference fringe images are simultaneously captured by at least one image pickup device which is smaller in number than the interference fringe images. At least three pieces of interference fringe image information are calculated using the at least three obtained interference fringe images and the predetermined phase shift amounts to thereby calculate a shape of the observed surface from the at least three pieces of interference fringe image information.

7 Claims, 4 Drawing Sheets

INCIDENT LIGHT

INCIDENT LIGHT

SHAPE MEASURING APPARATUS

BACKGROUND OF THE INVENTION

1. Field of the Invention

The present invention relates to a shape measuring apparatus, and particularly, to a shape measuring apparatus for measuring the shape of an object to be measured by simultaneously picking up images of a plurality of phase-shifted interference fringe images obtained by a phase shift method.

2. Prior Art

Conventional measuring apparatuses for measuring the surface shape of an object to be measured include a type that performs a measuring operation in a non-contact manner using the phase shift method. The phase shift method comprises causing a part of light emitted from a light source to be reflected from a reference surface, while causing light passing through the reference surface to be reflected from an observed surface of the measured object, subsequently causing optical images reflected from the reference surface and from the observed surface of the measured object to interfere with each other to induce an interference fringe, then phase-shifting the interference fringes by predetermined amounts to obtain at least three pieces of interference fringe image information from the observed surface of the measured object, and finally capturing these pieces of interference fringe image information by respective corresponding image pickup devices.

As the phase shift method, it is generally employed to vary the phase of interference fringes with the lapse of time using an optical-path varying method of moving the reference surface along an optical axis to physically vary an optical path length by a very small amount or a wavelength varying method of varying a wavelength from a light source by a very small amount with the optical path length fixed.

However, the phase shift method of varying the phase of interference fringes with the lapse of time requires a certain amount of time to obtain at least the interference fringe image information before capturing the interference fringes, on which a subsequent analysis is based. Consequently, not only the amount of time required for the analysis increases but also the results of the analysis are affected by fluctuation, vibration, or the like of air in which the analysis is carried out, thereby making it difficult to keep the results of the analysis reliable.

To solve this problem with the phase shift method of varying the phase of interference fringe images with the lapse of time, a three-way dispersing phase shift method has been proposed, which comprises simultaneously obtaining three interference fringe images of different phases by splitting light from a laser beam source into three beams using two beam splitters, passing these beams through respective corresponding wavelength plates, and then picking up images using three image pickup devices (for example, Japanese Laid-Open Patent Publication (KOKAI) No. 10-281738 and Japanese Laid-Open Patent Publication (KOKAI) No. 11-337321).

However, the three-way dispersing phase shift method enables three interference fringe images to be simultaneously obtained using three image pickup devices, but it is difficult to completely match a sensitivity characteristic or the like between the image pickup devices. The interference fringe images obtained by the image pickup devices actually are different from each other in positional deviation, relative size (bias value) and brightness (contrast value), so that differences in sensitivity characteristic between the image pickup devices are superposed on each other to cause errors, resulting in a failure to obtain accurate shape errors.

Further, since, for example, the conventional three-way dispersing phase shift method requires the use of three image pickup devices, measures must be taken to synchronize these image pickup devices with each other, and moreover, this requires the use of an image input device that can simultaneously capture three pieces of interference fringe image information.

Thus, due to the needs for a plurality of (for example, three) image pickup devices, the above conventional phase shift method has several problems; for example, it is difficult to electrically adjust these image pickup devices and to adjust their physical locations so as to match them with each other, which makes it difficult to achieve accurate shape measurement, and an image pickup system that is necessarily large in size and complicated in structure is required to implement this method.

SUMMARY OF THE INVENTION

It is an object of the present invention to provide a shape measuring apparatus which is capable of accurately measuring the shape of an observed surface of an object to be measured and which can be designed to be compact in size and light in weight.

To attain the above object, according to the present invention, there is provided a shape measuring apparatus comprising an interference optical system including a reference surface member having a reference surface, for causing an optical reflected image from an observed surface of an object to be measured and an optical reflected image from the reference surface to interfere with each other to generate interference light, dispersing means for dispersing the interference light generated by means of interference by the interference optical system into at least three beams, shifting means for shifting the at least three dispersed beams by respective predetermined phase shifting amounts, interference fringe image obtaining means for simultaneously obtaining at least three interference fringe images obtained by means of shifting by the shifting means, and calculating means for calculating at least three pieces of interference fringe image information using the at least three obtained interference fringe images and the predetermined phase shift amounts to thereby calculate a shape of the observed surface from the at least three pieces of interference fringe image information, wherein the interference fringe image obtaining means comprises at least one image pickup device which is smaller in number than the interference fringe images.

With the above construction, the interference fringe obtaining means comprises at least one image pickup device which is smaller in number than the at least three interference fringe images, so that the at least three phase-shifted interference fringe images are picked up by the at least one image pickup device smaller in number than the at least three interference fringe images, thereby enabling errors between the individual image pickup devices to be reduced, which errors may occur if the at least three interference fringe images are picked up using at least three image pickup devices. As a result, the size of the observed surface of the measured object can be accurately measured and the entire size and weight of the apparatus can be reduced.

Preferably, the interference fringe image obtaining means comprises a single image pickup device.

Also preferably, the at least three beams have geometrically the same optical path length.

With this construction, by virtue of the use of the same geometrical optical path length, each of the three phase-shifted interference fringe images can be reliably picked up under the same conditions by the single image pickup device.

Further preferably, refractive-index media having different refractive indices or the like are arranged and disposed on respective corresponding optical paths for the at least three beams such that the optical paths for the at least three beams have optically the same length.

With this construction, by virtue of the use of the same optical path length, each of the three phase-shifted interference fringe images can be reliably picked up under the same conditions by the single image pickup device.

The above and other objects of the Invention will become more apparent from the following detailed description taken in conjunction with the accompanying drawings.

DETAILED DESCRIPTION OF PREFERRED EMBODIMENTS

The present invention will now be described in detail with reference to the drawings showing preferred embodiments thereof.

Figure 1:
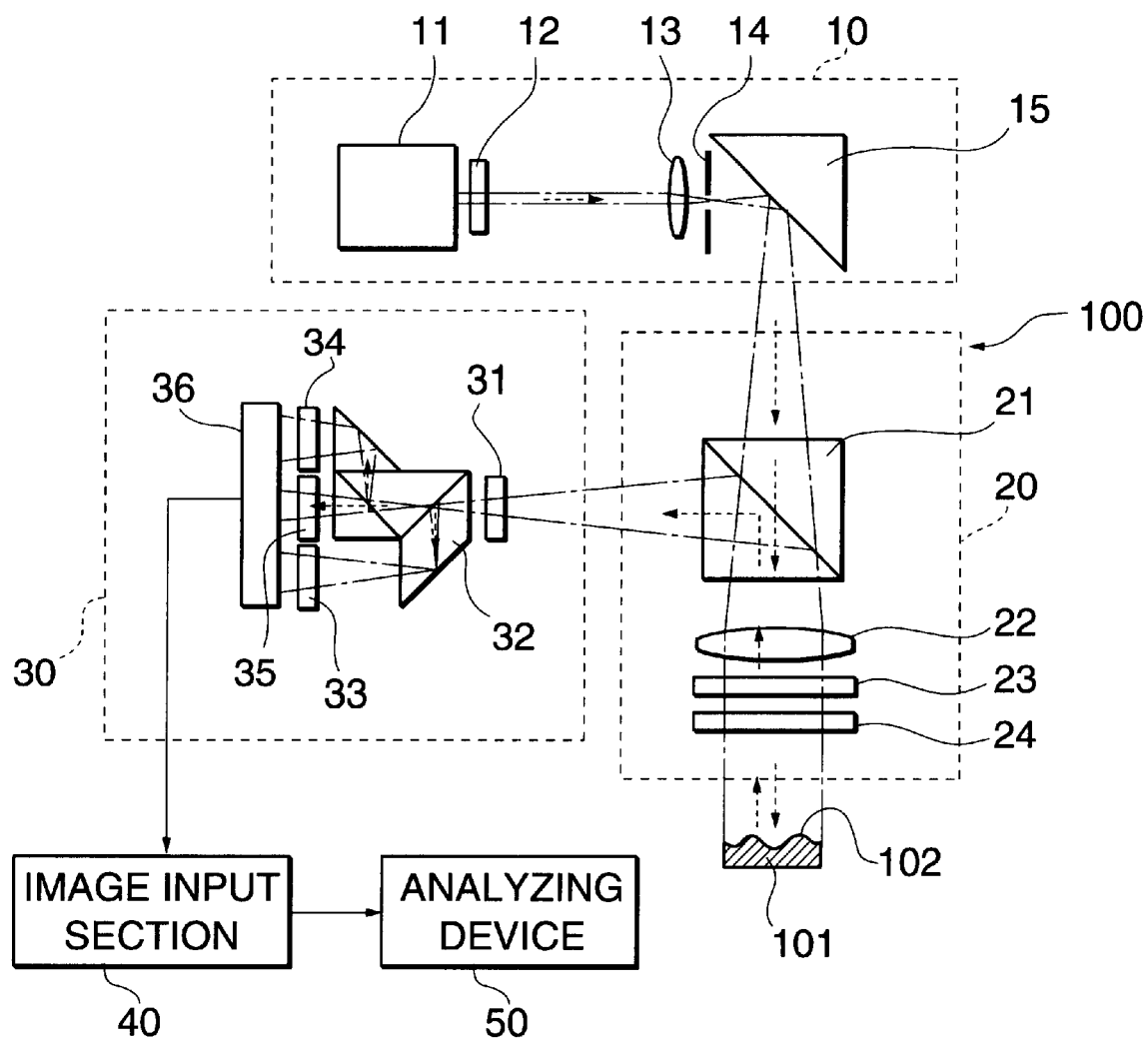
FIG. 1 is a schematic view showing a shape measuring apparatus according to a first embodiment of the present invention, which uses the three-way dispersing phase shift method.

FIG. 1 is a schematic view showing a shape measuring apparatus according to a first embodiment of the present invention, which uses the three-way dispersing phase shift method.

In FIG. 1, the shape measuring apparatus according to the present embodiment is comprised of a phase-shifted interference fringe simultaneous-measuring apparatus 100 principally composed of a light emitting section 10, a reference section 20, an image pickup section 30, an image input section 40, and an analyzing device 50.

The light emitting section 10 is comprised of a laser beam source 11, a polarizing plate 12, a lens 13, a pin hole 14, and a total-reflection mirror 15.

A beam from the laser beam source 11 is linearly polarized by the polarizing plate 12, and the linearly polarized light obtained is then converged by the lens 12, subsequently passes through the pin hole 14, and is then reflected by the total-reflection mirror 15 as diverged light.

The reference section 20 is comprised of a beam splitter 21 having a refractive index and a transmission factor which are not dependent on polarization, a collimator lens 22, a reference surface member 23 with a reference surface, and a λ/4 wavelength plate 24.

The linearly polarized diverged light reflected by the total-reflection mirror 15 is transmitted through the beam splitter 21 and then collimated into parallel rays by means of the collimator lens 22. Then, reflected light from a surface of the reference surface of the reference surface member 23 is used as reference light, and a non-interference beam containing this reference light and measuring light from an inspected surface (observed surface) of an object to be measured 101 is reflected by the beam splitter 21.

The image pickup section 30 is comprised of a λ/4 wavelength plate 31, a three-way dispersing prism 32, a first polarizing plate 33, a second polarizing plate 34, a third polarizing plate 35, and a single image pickup device 36.

The beam reflected by the beam splitter 21, which is in a non-optically interfered state, is split by the three-way dispersing prism 32 into a first dispersed beam, a second dispersed beam, and a third dispersed beam, which reach the single image pickup device 36 via the first polarizing plate 33, the second polarizing plate 34, and the third polarizing plate 35, respectively.

The image input section 40 is connected to the image pickup device 36, and the analyzing device 50 is connected to the image input section 40.

In the present embodiment, the total-reflection mirror 15 is not essential and may be omitted, if required.

Now, a manner of calculating heights (shape information) at various positions on the inspected surface 102 will be described.

The phase shift method requires three or more pieces of phase-shifted image data (light intensity distribution). For example, let it be assumed that the wavelength of the laser beam is varied by a very small known amount for picking up three images. If three types of wavelengths thus varied are defined by $\lambda k = \lambda - \alpha$, $\lambda$, $\lambda + \beta$ and the distance between the inspected surface and the reference surface is defined by $z(x, y)$ with respect to an arbitrary position $(x, y) \in S$, then the phase difference $(2h/\lambda k) * 2\pi = 4\pi h/\lambda k$ is given.

Thus, the light intensity distribution $I_k(x, y)$ ($k=1, 2, 3$) of three interference fringes is expressed with respect to an arbitrary position $(x, y)$, by the following relational expressions:

$$I_1(x, y) = I_B(x, y) + I_A(x, y)\cos\left(\frac{4\pi z(x, y)}{\lambda} + \frac{4\pi z(x, y)}{\lambda^2}\alpha\right) \quad \text{[Expressions 1]}$$

$$I_2(x, y) = I_B(x, y) + I_A(x, y)\cos\left(\frac{4\pi z(x, y)}{\lambda}\right)$$

$$I_3(x, y) = I_B(x, y) + I_A(x, y)\cos\left(\frac{4\pi z(x, y)}{\lambda} - \frac{4\pi z(x, y)}{\lambda^2}\beta\right)$$

where the light intensity distribution $I_k(x, y)$ is a measured value, $I_B(x, y)$ is a bias value of the interference fringe, and $I_A(x, y)$ is an amplitude value thereof.

Then, from the above equations (1), (2), (3) is obtained the following expression:

$$\begin{pmatrix} I_B \\ I_A\cos\theta \\ I_A\sin\theta \end{pmatrix} = \begin{pmatrix} 1 & \cos\alpha' & -\sin\alpha \\ 1 & 1 & 0 \\ 1 & \cos\beta' & \sin\beta' \end{pmatrix}^{-1} \begin{pmatrix} I_1 \\ I_2 \\ I_3 \end{pmatrix} \quad \text{[Expression 2]}$$

where $$\theta = \frac{4\pi z(x, y)}{\lambda}, \; \alpha' = \frac{4\pi z(x, y)}{\lambda^2}\alpha, \; \beta' = \frac{4\pi z(x, y)}{\lambda^2}\beta$$

Here, height information $z(x, y)$ given by the following values $a\alpha'$ and $\beta'$:

$$\alpha' = \frac{4\pi z(x, y)}{\lambda^2}\alpha, \beta' = \frac{4\pi z(x, y)}{\lambda^2}\beta \qquad \text{[Expression 3]}$$

has an average value but can specifically be determined from $z(x, y)=\theta\lambda/4\pi$ by solving:

$$\theta = \tan^{-1}\left(\frac{I_1(1-\cos\beta') + I_2(\cos\beta' - \cos\alpha') + I_3(-1+\cos\alpha')}{I_1\sin\beta' - I_2(\sin\beta' + \sin\alpha') + I_3\sin\alpha'}\right) \qquad \text{[Expression 4]}$$

Next, the image pickup section 30 of the present embodiment will be described in detail.

Figure 2:
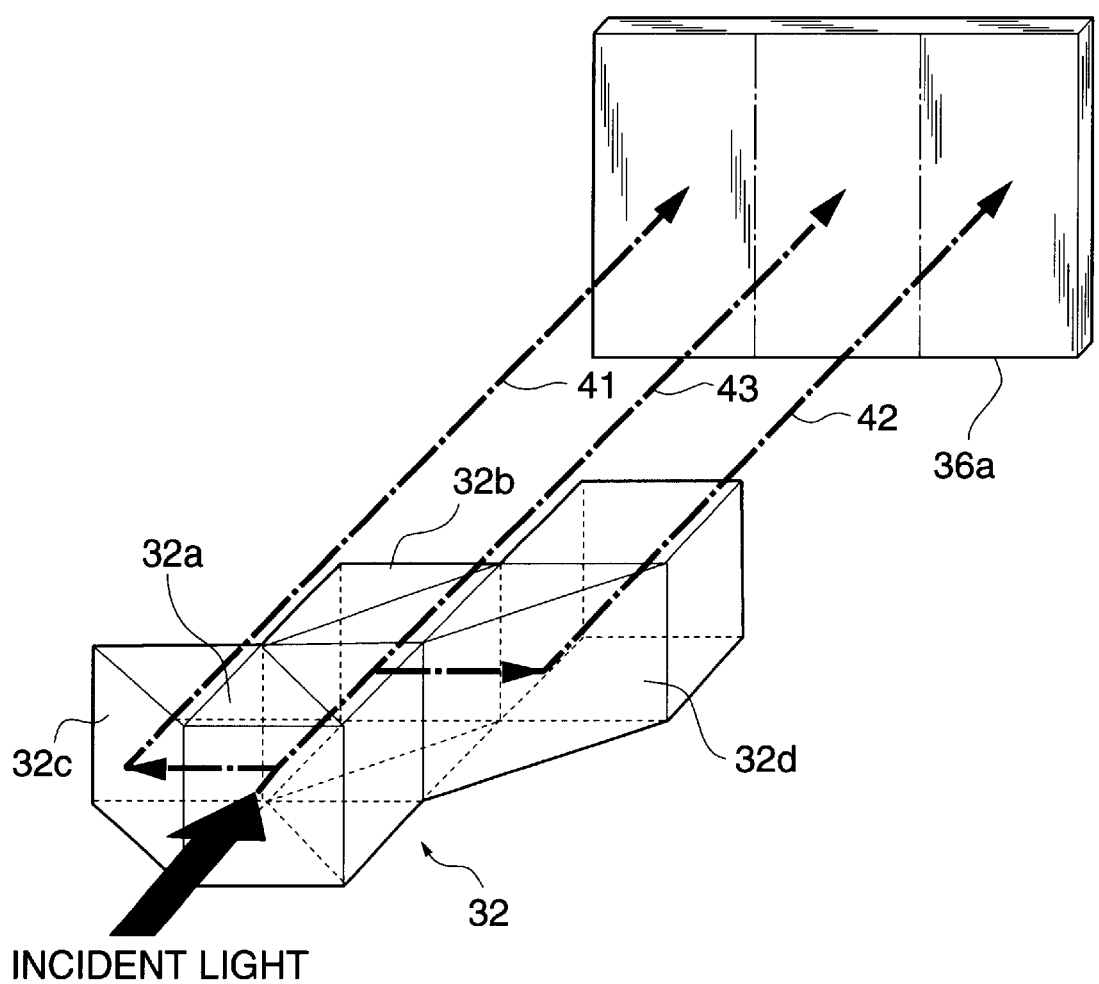
FIG. 2 is a schematic view showing the construction of essential parts of an image pickup section 30 of the shape measuring apparatus according to the first embodiment.

FIG. 2 is a schematic view showing the construction of essential parts of the image pickup section 30 of the shape measuring apparatus according to the first embodiment. In FIG. 2, there are shown only the three-way dispersing prism 32 and an image pickup element 36a of the image pickup device 36, which are essential parts of the image pickup section 30, with the λ/4 wavelength plate 31, the first polarizing plate 33, the second polarizing plate 34, and the third polarizing plate 35 omitted. This applies to the other embodiments, described later.

In FIG. 2, the three-way dispersing prism 32 is comprised of a combination of a set of beam splitters 32a and 32b, a rectangular prism 32c with a total-reflection mirror located adjacent to the beam splitter 32a, and a rectangular prism 32d with a total-reflection mirror located adjacent to the beam splitter 32b.

A part of light incident on the beam splitter 32a is transmitted through the beam splitter 32a, while the remaining part is reflected such that its advancing direction is bent through 90 degrees, and then the reflected light is further reflected and bent in advancing direction through 90 degrees by the rectangular prism 32c, whereby it is thus dispersed as a first dispersed beam 41 directed toward the single image pickup element 36a of the image pickup device 36. A part of the light transmitted through the beam splitter 32a is transmitted through the beam splitter 32b, while the remaining part is reflected such that its advancing direction is bent through 900 and the bent light further has its advancing direction bent through 90 degrees, and then the reflected light is further reflected and bent in advancing direction by the rectangular prism 32d, whereby it is thus dispersed as a second dispersed beam 42 directed toward the image pickup element 36a in parallel with the first dispersed beam 41. Furthermore, a part of the light transmitted through the beam splitter 32b is dispersed as a third dispersed beam 43 directed toward the image pickup element 36a in parallel with the first dispersed beam 41.

The first to third dispersed beams 41, 42, and 43 are applied to the image pickup element 36a via the first polarizing plate 33, the second polarizing plate 34, and the third polarizing plate 35, respectively. The image pickup device 36 thereby simultaneously picks up images of three phase-shifted interference fringe images at physically different locations of an image pickup area of the single image pickup device 36a, and then transmits the picked-up interference fringe images to the image input section 40. The image input section 40 performs a calibration process of correcting positional deviations between the interference fringe images and matching relative sizes (bias values) and brightness levels (contrast values) between them. Then, the image input section uses predetermined software to cut out interference fringe image information corresponding to required portions of the inspected surface 102, and then transmits the information to the analyzing device 50. The analyzing device 50 uses the interference fringe image information as phase-shifted analyzed images to calculate the shape of the observed surface of the measured object.

According to the shape measuring apparatus of the above described first embodiment, the three phase-shifted interference fringe images can be obtained by the single image pickup device, thereby enabling errors between individual image pickup devices to be reduced, which errors may occur if at least three interference fringe images are picked up using at least three image pickup devices as in the prior art. As a result, the size of the observed surface of the measured object can be accurately measured without changing an existing analysis algorithm and the entire size and weight of the apparatus can be reduced.

In the above described first embodiment, the single image pickup device is used for the three interference fringe images, but two or more image pickup devices may be used insofar as they are smaller in number than the interference fringe images. This applies to the other embodiments, described later.

Figure 3:
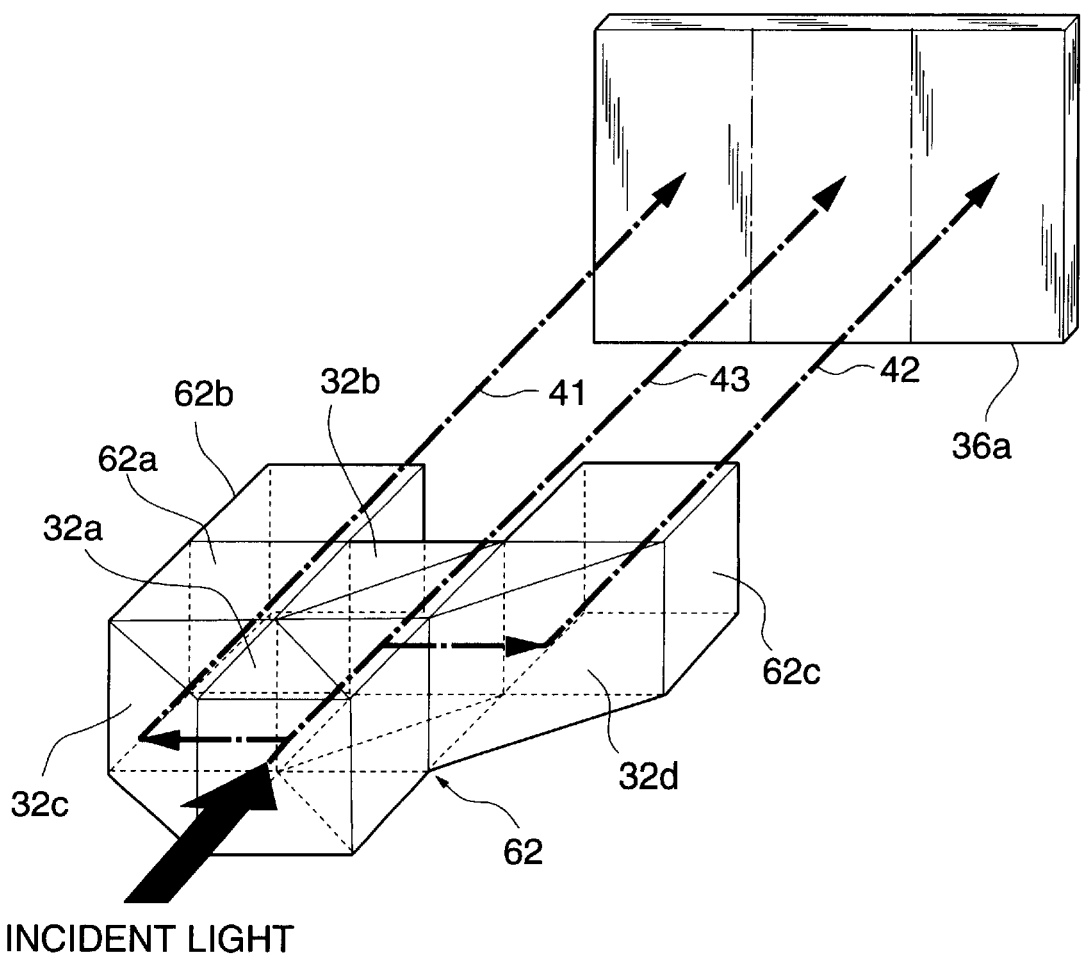
FIG. 3 is a schematic view showing the construction of essential parts of an image pickup section 30 of a shape measuring apparatus according to a second embodiment.

FIG. 3 is a schematic view showing the construction of essential parts of the image pickup section 30 of a shape measuring apparatus according to a second embodiment of the present invention.

The shape measuring apparatus according to the present embodiment is different from the apparatus 100 according to the above described first embodiment in that the three-way dispersing prism 32 shown in FIG. 2 is replaced with a three-way dispersing prism 62 shown in FIG. 3.

The image pickup section 30 of the present embodiment will be explained below with reference to FIG. 3.

In FIG. 3, the three-way dispersing prism 62 is comprised of the three-way dispersing prism 32 shown in FIG. 2, which is composed of the combination of the set of beam splitters 32a and 32b, the rectangular prism 32c with the total-reflection mirror located adjacent to the beam splitter 32a, and the rectangular prism 32d with the total-reflection mirror located adjacent to the beam splitter 32b, rectangular-parallelopiped refractive-index adjusting members 62a and 62b arranged at an output side of the rectangular prism 32c on the optical path for the first dispersed beam 41, and a rectangular-parallelopiped refractive-index adjusting member 62c arranged at an output side of the rectangular prism 32d on the optical path for the second dispersed beam 42.

The operation of dispersion of the incident light into the first to third dispersed beams 41, 42, and 43 which is performed by the three-way dispersing prism 62 is similar to that in the above described first embodiment except that the first dispersed beam 41 passes through the refractive-index adjusting members 62a and 62b, while the second dispersed beam 42 passes through the refractive-index adjusting member 62c. The refractive-index adjusting members 62a, 62b, and 62c each have an optical path length which is dependent on its refractive index. The refractive indices of the refractive-index adjusting members 62a, 62b, and 62c are adjusted such that the optical paths for the first to third dispersed beams 41, 42, and 43 have optically the same length. The refractive-index adjusting members 62a, 62b, and 62c are each formed of a birefringent medium in the form of a wavelength plate or the like which is properly selected so as to have such a required refractive index that the optical paths for the dispersed beams 41, 42, and 43 have optically the same length.

According to the shape measuring apparatus of the second embodiment, the optical paths for the first to third dispersed beams 41, 42, and 43 have optically the same length. As a result, when the three phase-shifted interference fringe images are obtained by the single image pickup device, these interference fringe images can be reliably picked up under the same conditions.

Figure 4:
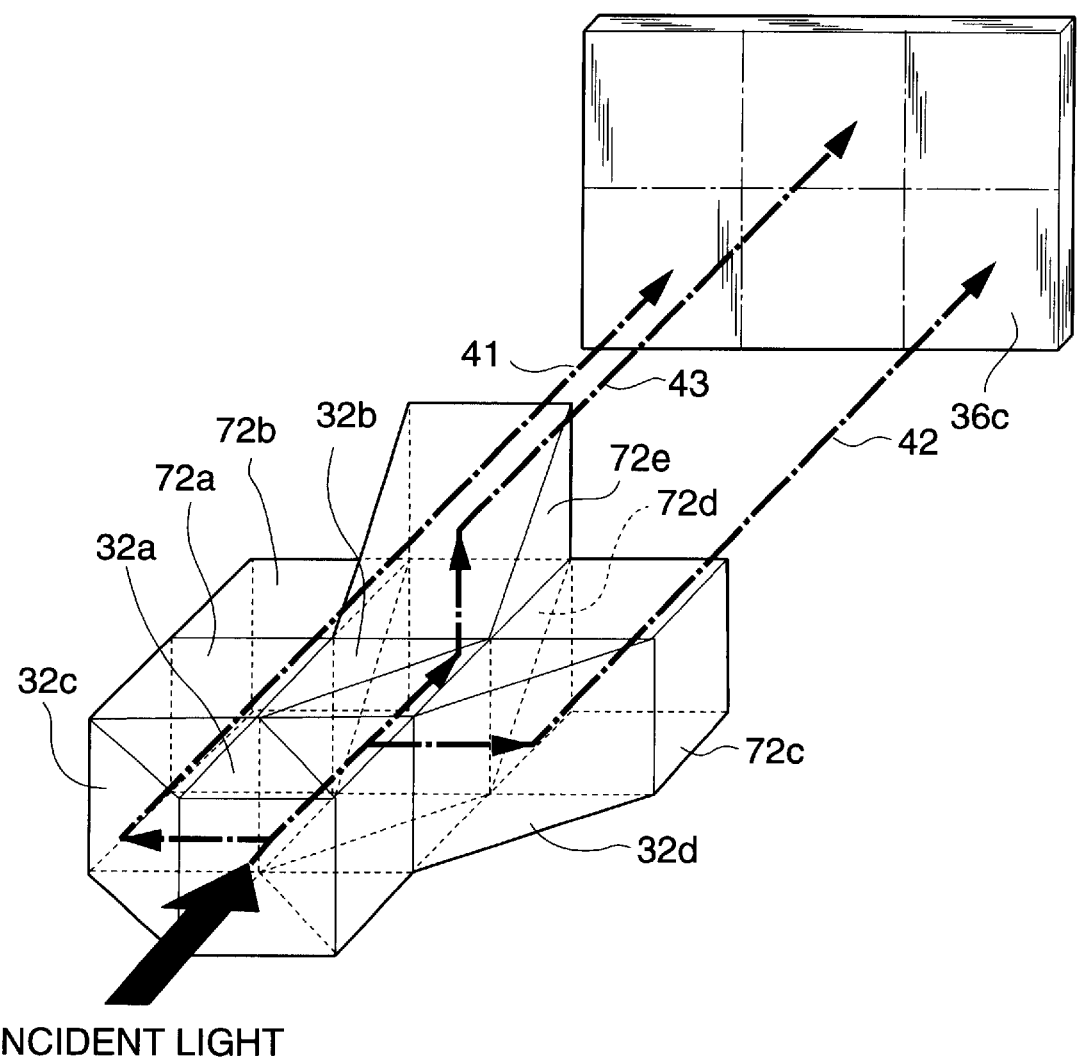
FIG. 4 is a schematic view showing the construction of essential parts of an image pickup section 30 of a shape measuring apparatus according to a third embodiment.

FIG. 4 is a schematic view showing the construction of essential parts of the image pickup section 30 of a shape measuring apparatus according to a third embodiment of the present invention.

The shape measuring apparatus according to the present embodiment is different from the apparatus 100 according to the above described first embodiment in that the three-way dispersing prism 32 shown in FIG. 2 is replaced with a three-way dispersing prism 72 shown in FIG. 4.

The image pickup section 30 of the present embodiment will be explained below with reference to FIG. 4.

In FIG. 4, the three-way dispersing prism 72 is comprised of the three-way dispersing prism 32 shown in FIG. 2, which is composed of the combination of the set of beam splitters 32a and 32b, the rectangular prism 32c with the total-reflection mirror located adjacent to the beam splitter 32a, and the rectangular prism 32d with the total-reflection mirror located adjacent to the beam splitter 32b, rectangular-parallelopiped glass members 72a and 72b arranged at the output side of the rectangular prism 32c on the optical path for the first dispersed beam 41, a rectangular-parallelopiped glass member 72c arranged at the output side of the rectangular prism 32d on the optical path for the second dispersed beam 42, and a pair of rectangular prisms 72d and 72e each having a total-reflection mirror and arranged at an output side of the beam splitter 32b. The beam splitters 32a and 32b, the rectangular prisms 32c, 32d, 72d, and 72e, and the rectangular-parallelopiped glass members 72a to 72c are each formed of the same glass material.

The operation of dispersion of the incident light into the first to third dispersed beams 41, 42, and 43, which is performed by the three-way dispersing prism 72 is similar to that in the above described first embodiment.

A part of light transmitted through the beam splitter 32b is reflected and bent in advancing direction through 90 degrees by the rectangular prism 72d and then by the rectangular prism 72e, whereby it is thus dispersed as a third dispersed beam 43. The rectangular prisms 72d and 72e and the rectangular-parallelopiped glass members 72a and 72c serve to make the optical path lengths for the first to third dispersed beams 41, 42, and 43 geometrically the same.

According to the shape measuring apparatus of the third embodiment, the optical paths for the first to third dispersed beams 41, 42, and 43 have geometrically the same length, and moreover, the first to third dispersed beams 41, 42, and 43 are transmitted through the respective glass materials over the same distance. As a result, when the three phase-shifted interference fringe images are obtained by the single image pickup device, these interference fringe images can be reliably picked up under the same conditions.

In the above described first to third embodiments, the beam splitters 21, 32a, and 32b are suitably of a non-polarization type, but may be of a polarization type as required.

What is claimed is:

1. A shape measuring apparatus comprising:
an interference optical system including a reference surface member having a reference surface, for causing an optical reflected image from an observed surface of an object to be measured and an optical reflected image from said reference surface to interfere with each other to generate interference light;
dispersing means for dispersing the interference light generated by means of interference by said interference optical system into at least three beams;
shifting means for shifting said at least three dispersed beams by respective predetermined phase shifting amounts;
interference fringe image obtaining means for simultaneously obtaining at least three interference fringe images obtained by means of shifting by said shifting means; and
calculating means for calculating at least three pieces of interference fringe image information using said at least three obtained interference fringe images and said predetermined phase shift amounts to thereby calculate a shape of said observed surface from the at least three pieces of interference fringe image information,
wherein said interference fringe image obtaining means comprises at least one image pickup device which is smaller in number than said interference fringe images.

2. A shape measuring apparatus according to claim 1, wherein said interference fringe image obtaining means comprises a single image pickup device.

3. A shape measuring apparatus according to claim 1 or 2, wherein optical paths for said at least three beams have geometrically the same length.

4. A shape measuring apparatus according to claim 1 or 2, including a plurality of media arranged on optical paths for said at least three beams, said media having refractive indices set such that the optical paths for said at least three beams have optically the same length.

5. A shape measuring apparatus according to claim 1, wherein said shifting means comprises a set of beam splitters, a first rectangular prism having a total-reflection mirror and located adjacent to one of said beam splitters, and a second rectangular prism having a total-reflection mirror and located adjacent to another one of said beam splitters.

6. A shape measuring apparatus according to claim 1, wherein said shifting means comprises a set of beam splitters, a first rectangular prism having a total-reflection mirror and an output side and located adjacent to one of said beam splitters, a second rectangular prism having a total-reflection mirror and an output side and located adjacent to another one of said beam splitters, at least one first refractive-index adjusting member arranged at the output side of said first rectangular prism on an optical path for one of said at least three dispersed beams, and at least one second refractive-index adjusting member arranged at the output side of said second rectangular prism on an optical path for another one of said at least three dispersed beams.

7. A shape measuring apparatus according to claim 1, wherein said shifting means comprises a set of beam splitters each having an output side, a first rectangular prism having a total-reflection mirror and an output side and located adjacent to one of said beam splitters, a second rectangular prism having a total-reflection mirror and an output side and located adjacent to another one of said beam splitters, at least one first rectangular-parallelopiped glass member arranged at the output side of said first rectangular prism on an optical path for one of said at least three dispersed beams, at least one second rectangular-parallelopiped glass member arranged at the output side of said second rectangular prism on an optical path for another one of said at least three dispersed beams, and a third rectangular prism having a pair of total-reflection mirrors arranged at the output side of one of said beam splitters.

* * * * *